UNITED STATES PATENT OFFICE.

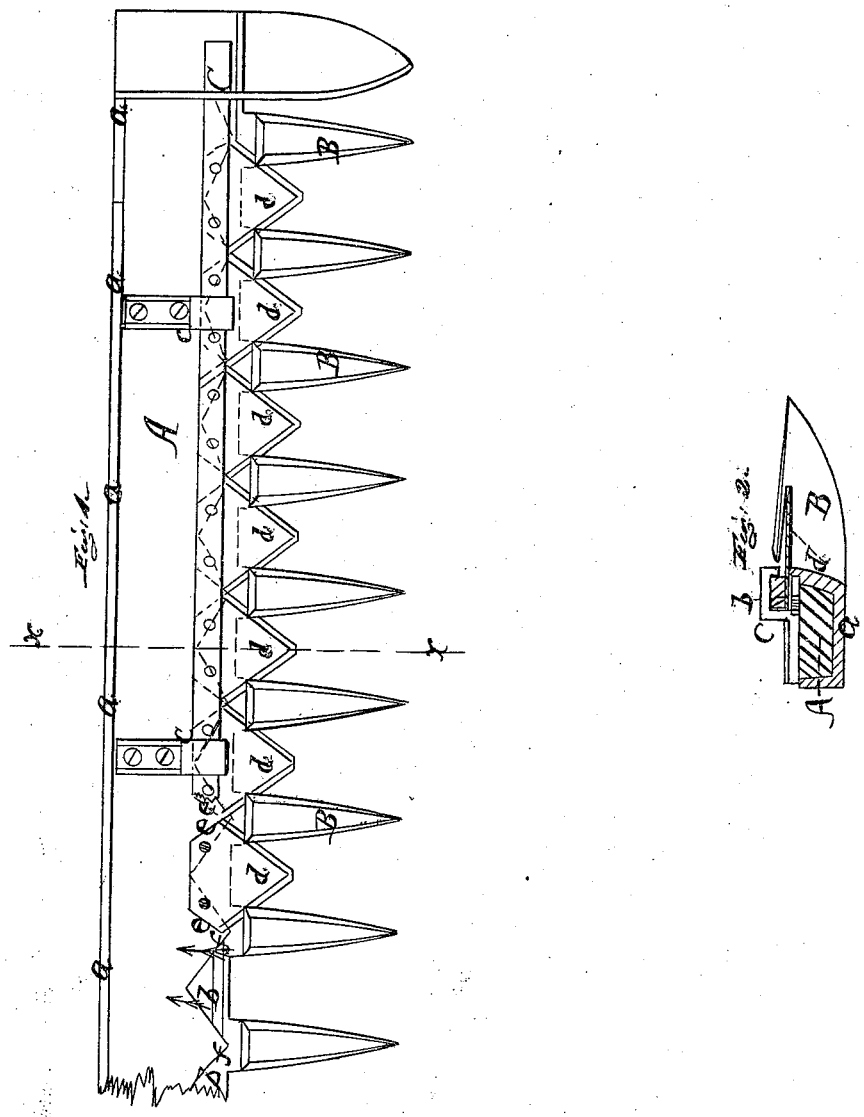

H. MARCELLUS, OF AMSTERDAM, NEW YORK.

IMPROVEMENT IN GRAIN AND GRASS HARVESTERS.

Specification forming part of Letters Patent No. 19,938, dated April 13, 1858.

*To all whom it may concern:*

Be it known that I, H. MARCELLUS, of Amsterdam, in the county of Montgomery and State of New York, have invented a new and useful Improvement in Cutting Devices for Grain and Grass Harvesters; and I do hereby declare that the following is a full, clear, and exact description of the same, reference being had to the annexed drawings, making a part of this specification, in which—

Figure 1 is a plan or top view of my improvement. Fig. 2 is a transverse section of the same, taken in the line $x\ x$, Fig. 1.

Similar letters of reference indicate corresponding parts in the two figures.

This invention relates to an improvement in the reciprocating cutter which is most generally used for harvesters, and has for its object the prevention of the same from being choked or clogged.

The invention consists in having horizontal V-shaped ledges at the back parts of the fingers, and having the back parts of the teeth, which are underneath the cutter-bar, and which work over the V-shaped ledges, formed obliquely at their sides, so that as the sickle or cutter is operated the V-shaped ledges, in connection with the oblique sides of the teeth, will force outward from the back part of the sickle all cut grass or grain, which might pass between the cutter-bar and fingers, and which would otherwise choke or clog the cutter, so as to render the same inoperative.

To enable those skilled in the art to fully understand and construct my invention, I will proceed to describe it.

A represents the finger-bar of a harvester, and B are the fingers, attached thereto by means of plates $a$, which extend around the bottom of the finger-bar and upward at the bottom of said bar.

To the plates $a$, and at points directly between the fingers B, triangular or V-shaped ledges $b$ are secured. These ledges project over the front part of the finger-bar A a certain distance, so that their ends will project a trifle beyond the back edge of the cutter-bar C, which works in guides $c$, attached to the finger-bar and directly over the ledges $b$.

The cutter-bar C has V-shaped cutter-teeth $d$, attached to its under side. These cutters have their back parts made oblique at their sides, as shown at $e$—that is to say, the parts that are directly underneath the bar C. (See Fig. 1, in which a portion of the cutter-bar is broken away in order to show clearly this feature.)

The back parts of the teeth $d$ work directly over the ledges $b$, and the teeth $d$ work, as usual, in or through the slots of the fingers B, and in case any grass or grain should work or find its way between the teeth $d$ and the fingers it will, by the motion of the cutter, cross or work over at the angles $f$, formed by the ledges $b$, and will be caught between the edges of the ledges $b$ and the oblique sides $e$ of the teeth $d$, and will, as the cutter operates, be forced outward from the back part of the cutter, as shown by the arrow in Fig. 1.

By this simple device the cutter will be effectually prevented from choking in consequence of grass or grain working in between the cutter-teeth and the fingers—a contingency which frequently occurs, especially when the cutter-teeth become a little dull or blunt.

Having thus described my invention, what I claim as new, and desire to secure by Letters Patent, is—

The V-shaped ledges $b$, secured in any proper way between the fingers B at their back parts, in combination with the oblique sides $e$ at the back parts of the cutter-teeth $d$, the parts being arranged to operate substantially as and for the purpose set forth.

HENRY MARCELLUS.

Witnesses:
GEO. C. BELL,
HARVEY BELL.